3,287,467
CERTAIN 3-LOWER ALKYL-5-(ARYLIMINO)-2,4-THIAZOLIDINEDIONE COMPOUNDS

Henry J. Gerjovich, Wilmington, Del., assignor to E. I. du Pont de Nemours and Company, Wilmington, Del., a corporation of Delaware
No Drawing. Filed July 19, 1965, Ser. No. 473,201
13 Claims. (Cl. 260—306.7)

This invention relates to the herbicidal use of 5-imino-2,4-thiazolidinediones. More specifically, this invention relates to 5-phenylimino-2,4-thiazolidinediones of the following formula and to their use as herbicides:

(1)
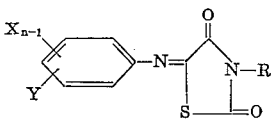

wherein R is alkyl of from one to 4 carbons; X is halogen, and $n$ is a positive integer less than 3, namely 1 or 2; and Y is hydrogen, halogen, alkyl of from one to 4 carbon atoms, alkoxy of from one to 4 carbon atoms, $NO_2$, or $CF_3$.

I have discovered that the above-described compounds have outstanding herbicidal activity against a broad spectrum of weeds whether used pre-emergence, directed post-emergence, or in the form of an overall application for general vegetation control.

PREPARATION

The compounds of this invention can be prepared by first treating a substituted phenylisothiocyanate with sodium or potassium cyanide to form a substituted 2-phenyl-imino-2-mercaptoacetonitrile which is in turn treated with an isocyanate in the presence of a suitable basic catalyst to form the 4-imino-5-phenylimino-2-thiazolidinone which is then treated with an acid such as hydrochloric acid as indicated below.

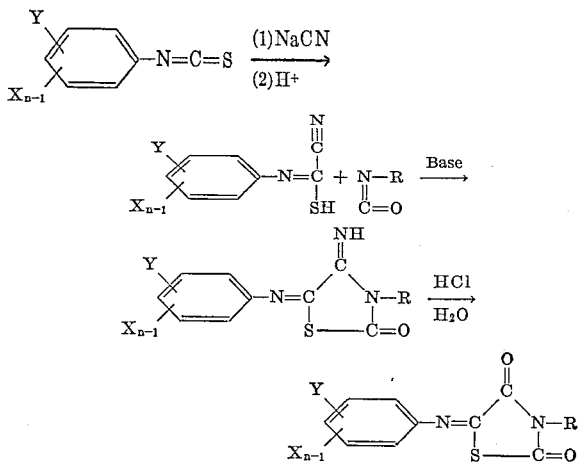

wherein X, Y, R and $n$ correspond to the same designations of Formula 1.

The preparation of these compounds is further illustrated in the examples.

Of the 5-phenylimino-2,4-thiazolidinediones of Formula 1, those in which R is methyl are most preferred because of their exceptional herbicidal activity.

COMPOSITIONS

Herbicidal compositions of the present invention can be prepared by admixing at least one of the compounds of Formula 1 with pest control adjuvants or modifiers to provide compositions in the form of dusts, granules, pellets, water-dispersible powders, high-strength concentrates, aqueous dispersions or emulsions and solutions or dispersions in organic liquids.

Thus, the compounds of Formula 1 can be used with a carrier or diluent agent such as a finely divided solid, an organic liquid, water, a wetting agent, a dispersing agent, an emulsifying agent, or any suitable combination of these.

Compositions of the invention, especially liquids and wettable powders, contain as a conditioning agent one or more surface-active agents, sometimes called surfactants, in amounts sufficient to render a given composition containing the compounds of Formula 1 readily dispersible in water or in oil.

The surface-active agent used in this invention can be a wetting, dispersing or an emulsifying agent which will assist dispersion of the compound. The surface-active agent or surfactant can include such anionic, cationic and non-ionic agents as have heretofore been generally employed in plant control compositions of similar type. Suitable surface-active agents are set forth, for example, in "Detergents and Emulsifiers," 1964 Annual, by John W. McCutcheon, Inc.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions have a greater herbicidal effectiveness than can be expected from a consideration of the activity of the components used separately. When used at higher rates it is preferred that the surfactant be present in the range of one-fifth to five parts surfactant for each one part of active agent.

A. WETTABLE POWDERS

Wettable powders are water-dispersible compositions containing the active material, an inert solid extender, and one or more surfactants to provide rapid wetting and prevent heavy flocculation when suspended in water.

The inert extenders which are preferred for use in the wettable powders of this invention containing the compounds of Formula 1 are of mineral origin.

The classes of extenders suitable for the wettable powder formulations of this invention are the natural clays, diatomaceous earth, and synthetic mineral fillers derived from silica and silicate. Most preferred fillers for this invention are kaolinites, attapulgite clay, montmorillonite clays, synthetic silicas, synthetic magnesium silicate and calcium sulfate dihydrate.

Suitable surfactants for use in such compositions are those listed by J. W. McCutcheon in "Detergents and Emulsifiers," 1964 Annual. Among the more preferred surfactants are the non-ionic and anionic type, and those most suitable for the preparation of the dry, wettable products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene and alkylnaphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, and dieteriary acetylenic glycols. Preferred dispersants are methyl cellulose, polyvinyl alcohol, lignin sulfonates, polymeric alkylnaphthalene sulfonates, sodium naphthalenesulfonate, polymethylene bisnaphthalenesulfonate, and sodium-N-methyl-N-(long chain acid) taurates.

Wetting and dispersing agents in these preferred wettable powder compositions of this invention are usually present at concentrations of from about 0.5 weight percent to 5 weight percent. The inert extender then completes the formulation. Where needed, 0.1 weight percent to 1.0 weight percent of the extender may be replaced by a corrosion inhibitor or an anti-foaming agent or both.

Thus, wettable powder formulations of the invention will contain from about 25 to 90 weight percent active material, from 0.5 to 2.0 weight percent wetting agent, from 0.25 to 5.0 weight percent dispersant, and from 9.25 to 74.25 weight percent inert extender, as these terms are described above.

When the wettable powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

B. HIGH STRENGTH COMPOSITIONS AND AQUEOUS SUSPENSIONS CONCENTRATES

High-strength compositions generally consist of 90 to 99.5% active ingredient and 0.5 to 10% of a liquid or solid surfactant such as those described by McCutcheon in "Detergents and Emulsifiers" 1964 Annual. Such high-strength compositions can often be used in a manner similar to the wettable powders but they are also suitable for further formulation.

The aqueous suspension concentrates are prepared by mixing together and sandgrinding an aqueous slurry of water-insoluble active ingredient in the presence of dispersing agents. Thus there is obtained a concentrated slurry of very finely divided particles in which the active ingredient is substantially all below 5 microns in size. This concentrated aqueous suspension is characterized by its extremely small particle size so that upon diluting and spraying, a very uniform coverage is obtained.

These aqueous suspension concentrates will contain from 15 to 40% of active ingredient, from 45 to 70% water with the remainder made up of surfactants, corrosion inhibitors, and suspending agents.

Suspensions in organic liquids can be prepared in a similar manner such as by replacing the water with mineral oil.

C. DUSTS

Dusts are dense powder compositions which are intended for application in dry form, in accordance with the preferred compositions and methods of the invention. Dusts are characterized by their free-flowing and rapid settling properties so that they are not readily windborne to areas where their presence is not desired. They contain primarily an active material and a dense, free-flowing, solid extender.

Their performance is sometimes aided by the inclusion of a wetting agent, and convenience in manufacture frequently demands the inclusion of an inert, absorptive grinding aid. For the dust compositions of this invention, the inert extender may be either of vegetable or mineral origin, the wetting agent is preferably anionic or non-ionic, and suitable absorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid absorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dusts of this invention are micaceous talcs, pyrophyllite, dense kaolin clays, tobacco dust and ground calcium phosphate rock such as that known as "Phosphodust," a trademark of the American Agricultural Chemical Company.

Preferred grinding aids are attapulgite clay, diatomaceous silica, synthetic fine silica and synthetic calcium and magnesium silicates. Preferred wetting agents are those previously described under wettable powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The wettable powders described above can also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent absorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the wettable powders used to make the dusts.

D. EMULSIFIABLE OILS

Emulsifiable oils are usually solutions of active material in non-water miscible solvents together with a surfactant.

For the compounds of this invention, emulsifiable oils can be made by mixing the active ingredient with a solvent and surfactant. Suitable solvents for the compounds of this invention are aromatic hydrocarbons including many weed oils, chlorinated solvents, and non-water miscible ethers, esters, or ketones. Suitable surfactants are those anionic or non-ionic agents known to the art as emulsifying agents. Such compounds can be found listed in "Detergents and Emulsifiers," 1964 Annual, by John W. McCutcheon, Inc.

Emulsifying agents most suitable for the emulsifiable oil compositions of this invention are long-chain alkyl or mercaptan polyethoxy alcohols, alkylaryl polyethoxy alcohols, sorbitan fatty acid esters, polyoxyethylene ethers with sorbitan fatty acid esters, polyethylene glycol esters with fatty or rosin acids, fatty alkylol amide condensates, calcium and amine salts of fatty alcohol sulfates, oil soluble petroleum sulfonates or, preferably, mixtures of these emulsifying agents. Such emulsifying agents will comprise from about 1 to 10 weight percent of the total composition. As described above, however, up to 5 parts of emulsifying agent for each part of 5-phenylimino-2,4-thiazolidinedione can be used.

Thus, emulsifiable oil compositions of the present invention will consist of from about 15 to 50 weight percent active material, about 40 to 82 weight percent solvent, and about 1 to 10 weight percent emulsifier, as these terms are defined and used above.

In some instances the oil solution may be intended merely for extension with other oils, such as weed oils. In this instance the emulsifying agents may be omitted and may be replaced by additional solvent.

E. GRANULES AND PELLETS

Granules and pellets are physically stable, particulate compositions containing a compound of Formula 1 which adheres to or is distributed through a basic matrix of a coherent, inert carrier with macroscopic dimensions. In order to aid leaching of the active ingredient from the granule or pellet, a surfactant can be present.

For the compounds of this invention, the inert carrier is preferably of mineral origin, and the surfactant is a compound known to the art as a wetting agent. Such compounds are listed by J. W. McCutcheon in "Detergents and Emulsifiers," 1964 Annual.

Suitable carriers are natural clays, some pyrophyllites and vermiculite. Suitable wetting agents are anionic or non-ionic.

For the granule compositions of this invention, most suitable carriers are of two types. The first are porous, absorptive, preformed granules, such as preformed and screened granular attapulgite or heat expanded, granular, screened vermiculite. On either of these, a solution of the active agent can be sprayed and will be absorbed at concentrations up to 25 weight percent of the total weight. The second, which are also suitable for pellets, are initially powdered kaolin clays, hydrated attapulgite, or bentonite clays in the form of sodium, calcium or magnesium bentonites. Water-soluble salts, such as sodium salts, may also be present to aid in the disintegration of granules or pellets in the presence of moisture. These ingredients are blended with the active components to give mixtures that are granulated or pelleted, followed by drying, to yield formulations with the active component distributed uniformly throughout the mass. Such granules and pellets can also be made with 25 to 30 weight percent active component, but more frequently a concentration of about 10 weight percent is desired for optimum distribution. The granular compositions of this invention are most useful in a size range of 15–30 mesh.

The most suitable wetting agents for the granular compositions of this invention depend upon the type of granule used. When preformed granules are sprayed with active material in liquid form the most suitable wetting agents are non-ionic, liquid wetters miscible with the solvent. These are compounds more generally known to the art as emulsifiers, and comprise alkylaryl polyether alcohols, alkyl polyether alcohols, polyoxyethylene sorbitan fatty acid esters, polyethylene glycol esters with fatty or rosin acids, fatty alkylol amide condensates, oil soluble petroleum or vegetable oil sulfonates, or mixtures of these. Such agents will usually comprise up to about 5 weight percent of the total composition.

When the active ingredient is first mixed with a powdered carrier and subsequently granulated, or pelleted, liquid non-ionic wetters can still be used, but it is usually preferable to incorporate at the mixing stage one of the solid, powdered anionic wetting agents such as those previously listed for the wettable powders. Such agents will comprise from about 0 to 2 weight percent of the total composition.

Thus, the preferred granular or pelleted formulations of this invention comprise about 5 to 30 weight percent active material, about 0 to 5 weight percent wetting agent, and about 65 to 95 weight percent inert mineral carrier, as these terms are used herein.

APPLICATION

The method of controlling the growth of weeds in accordance with the present invention comprises applying a 5-phenylimino-2,4-thiazolidinedione of Formula 1, ordinarily in a herbicidal composition such as those described above, to a locus or area to be protected from the undesirable plant growth. The active compound is applied in sufficient concentration to exert the desired herbicidal activity. The application can be made directly upon the locus or area and the vegetation thereon during the period of infestation. Representative of the weeds destroyed include the following: wild oats, wild mustard, crabgrass, barnyard grass, foxtail, Johnson grass from seed, bindweed from seed, ryegrass, pigweed and chickweed.

The dosage employed can be determined readily by those skilled in the art by conventional techniques. It is dependent upon the particular active ingredient employed, the nature of the formulation used, the type of treatment, the type of vegetation to be controlled, climatic conditions and the like. In general, pre-emergence application of from ¼ lb. to 5 lb. per acre of active ingredient is effective for killing weeds, however, for reasons of convenience and economy, a preferred amount would be from about ½ lb. to about 3 lbs. of active ingredient per acre. When the application is directed post-emergence an amount of from about ⅛ lb. to about 3 lbs. of active ingredient per acre is herbicidally effective. For general vegetation control, amounts of from 10 lbs. to 50 lbs. of active ingredient per acre are satisfactory.

In order that this invention can be better understood the following examples are given in which parts and percentages are by weight unless otherwise noted.

Example 1

A total of 76 parts by weight of 2-fluorophenylisothiocyanate contained in 200 parts by weight of 95% alcohol is stirred as 32.5 parts by weight of potassium cyanide contained in 300 parts by weight of water is gradually added. The temperature is maintained between 20–25° C. The reaction is stirred 3 more hours, and let stand 12 additional hours at room temperature. Five hundred parts by weight of water is added, the solution is filtered, and the filtrate is acidified with 45 parts by volume of concentrated hydrochloric acid. The product, 2-(2-fluorophenylimino)-2-mercaptoacetonitrile, is then obtained by filtration with a M.P. of 86–87.5° C.

The substituted 2-phenylimino-2-mercaptoacetonitriles used in Examples 2 and 4 through 81 are prepared by substituting equivalent amounts of the corresponding substituted phenylisothiocyanates for the 2-fluorophenylisothiocyanate of this example, and treating it with sodium or potassium cyanide under similar conditions.

Example 2

A total of 27 parts by weight of 2-(2-fluorophenylimino)-2-mercaptoacetonitrile and 0.1 part by weight of anhydrous triethylamine contained in 300 parts by weight of dry benzene is stirred as 10 parts by weight of methylisocyanate is gradually added. The temperature is maintained between 25–30°. The reaction mixture is stirred further for 3 more hours at room temperature. The solution is filtered, and the filtrate is concentrated in vacuum to yield 5-(2-fluorophenylimino)-4-imino-3-methyl-2-thiazolidinone, M.P. 157° C.

The substituted 5-phenylimino-4-imino-3-alkyl-2-thiazolidinones used in Examples 4 through 81 are prepared by substituting equivalent amounts of the corresponding substituted 2-phenylimino-2-mercaptoacetonitriles and isocyanates for the 2-(2-fluorophenylimino)-2-mercaptoacetonitrile and methyl isocyanate of this example.

Example 3.—5-(2-fluorophenylimino)-3-methyl-2,4-thiazolidinedione

A total of 2 parts by weight of 5-(2-fluorophenylimino)-4-imino-3-methyl-2-thiazolidinone contained in 60 parts by weight of 1/1 benzene/ether is cooled to 0 to 10°. While maintaining the temperature of the reaction between 0 and 10°, gaseous hydrogen chloride is added over several minutes. The mixture is filtered, and the solid collected has a melting point of 82–85° C.

Examples 4–81

The following products are prepared by first treating an arylisothiocyanate with potassium cyanide and to the resulting 2-arylimino-2-mercaptoacetonitriles are added the appropriate isocyanates yielding the intermediate 5-arylimino-4-imino-3-alkyl-2-thiazolidinones. Mild hydrolysis of the substituted 5-arylimino-4-imino-2-thiazolidinones as in Example 3 yield the 5-arylimino-3-alkyl-2,4-thiazolidinediones.

| Ex. | Substituted 2-phenylimino-2-mercaptoacetonitrile | Isocyanate | Intermediate | Product |
|---|---|---|---|---|
| 4 | 2-(3,4-dichlorophenylimino)-2-mercaptoacetonitrile. | Methylisocyanate | 5-(3,4-dichlorophenylimino)-4-imino-3-methyl-2-thiazolidinone. | 5-(3,4-dichlorophenylimino)-3-methyl-2,4-thiazolidinedione. |
| 5 | 2-(4-chlorophenylimino)-2-mercaptoacetonitrile. | ___do___ | 5-(4-chlorophenylimino)-4-imino-3-methyl-2-thiazolidinone. | 5-(4-chlorophenylimino)-3-methyl-2,4-thiazolidinedione. |
| 6 | 2-(4-chlorophenylimino)-2-mercaptoacetonitrile. | n-Butylisocyanate | 5-(4-chlorophenylimino)-4-imino-3-n-butyl-2-thiazolidoinone. | 5-(4-chlorophenylimino)-3-n-butyl-2,4-thiazolidinedione. |
| 7 | 2-(2-methyl-4-chlorophenyl-imino)-2-mercaptoacetonitrile. | Methylisocyanate | 5-(2-methyl-4-chlorophenylimino)-4-imino-3-methyl-2-thiazolidinone. | 5-(2-methyl-4-chlorophenylimino)-3-methyl-2,4-thiazolidinedione. |
| 8 | 2-(3-ethyl-4-chlorophenyl-imino)-2-mercaptoacetonitrile. | ___do___ | 5-(3-ethyl-4-chlorophenylimino)-4-imino-3-methyl-2-thiazolidinone. | 5-(3-ethyl-4-chlorophenylimino)-3-methyl-2,4-thiazolidinedione. |
| 9 | 2-phenylimino-2-mercapto-acetonitrile. | ___do___ | 5-phenylimino-4-imino-3-methyl-2-thiazolidinone. | 5-phenylimino-3-methyl-2,4-thiazolidinedione. |
| 10 | 2-(4-sec-butylphenylimino)-2-mercaptoacetonitrile. | ___do___ | 5-(4-sec-butylphenylimino)-4-imino-3-methyl-2-thiazolidinone. | 5-(4-sec-butylphenylimino)-3-methyl-2,4-thiazolidinedione. |
| 11 | 2-(2,4,6-trichlorophenyl-imino)-2-mercaptoacetonitrile. | | 5-(2,4,6-trichlorophenylimino)-4-imino-3-methyl-2-thiazolidinone. | 5-(2,4,6-trichlorophenylimino)-3-methyl-2,4-thiazolidinedione. |
| 12 | 2-(3-fluoro-4-chlorophenyl-imino)-2-mercaptoacetonitrile. | Ethylisocyanate | 5-(3-fluoro-4-chlorophenylimino)-4-imino-3-ethyl-2-thiazolidinone. | 5-(3-fluoro-4-chlorophenylimino)-3-ethyl-2,4-thiazolidinedione. |
| 13 | 2-(2-methoxy-5-chlorophenyl-imino)-2-mercaptoacetonitrile. | Methylisocyanate | 5-(2-methoxy-5-chlorophenylimino)-4-imino-3-methyl-2-thiazolidinone. | 5-(2-methoxy-5-chlorophenylimino)-3-methyl-2,4-thiazolidinedione. |
| 14 | 2-(4-methoxyphenylimino)-2-mercaptoacetonitrile. | ___do___ | 5-(4-methoxyphenylimino)-4-imino-4-methyl-2-thiazolidinone. | 5-(4-methoxyphenylimino)-3-methyl-2,4-thiazolidinedione. |
| 15 | 2-(4-isopropoxyphenylimino)-2-mercaptoacetonitrile. | ___do___ | 5-(4-isopropoxyphenylimino)-4-imino-3-methyl-2-thiazolidinone. | 5-(4-isopropoxyphenylimino)-3-methyl-2,4-thiazolidinedione. |
| 16 | 2-(2-nitro-4-chlorophenyl-imino)-2-mercaptoacetonitrile. | ___do___ | 5-(2-nitro-4-chlorophenylimino)-4-imino-3-methyl-2-thiazolidinone. | 5-(2-nitro-4-chlorophenylimino)-3-methyl-2,4-thiazolidinedione. |
| 17 | 2-(3-trifluoromethyl-6-chlorophenyl imino)-2-mercaptoacetonitrile. | ___do___ | 5-(3-trifluoromethyl-6-chlorophenyl imino)-4-imino-3-methyl-2-thiazolidinone. | 5-(3-trifluoromethyl-6-chlorophenylimino)-3-methyl-2,4-thiazolidinedione. |
| 18 | 2-(4-chlorophenylimino)-2-mercaptoacetonitrile. | Ethylisocyanate | 5-(4-chlorophenylimino)-4-imino-3-ethyl-2-thiazolidinedione. | 5-(4-chlorophenylimino)-3-ethyl-2,4-thiazolidinedione. |
| 19 | 2-(3-trifluoromethylphenyl-imino)-2-mercaptoacetonitrile. | ___do___ | 5-(3-trifluoromethylphenylimino)-4-imino-3-ethyl-2,4-thiazolidinedione. | 5-(3-trifluoromethylphenylimino)-3-ethyl-2,4-thiazolidinedione. |
| 20 | 2-(4-iodophenylimino)-2-mercaptoacetonitrile. | Methylisocyanate | 5-(4-iodophenylimino)-4-imino-3-methyl-2-thiazolidinone. | 5-(4-iodophenylimino)-3-methyl-2,4-thiazolidinedione. |
| 21 | 2-(4-isopropylphenylimino)-2-mercaptoacetonitrile. | ___do___ | 5-(4-isopropylphenylimino)-4-imino-3-methyl-2-thiazolidinone. | 5-(4-isopropylphenylimino)-3-methyl-2,4-thiazolidinedione. |
| 22 | 2-(3-nitrophenylimino)-2-mercaptoacetonitrile. | ___do___ | 5-(3-nitrophenylimino)-4-imino-3-methyl-2-thiazolidinone. | 5-(3-nitrophenylimino)-3-methyl-2,4-thiazolidinedione. |
| 23 | 2-(2-bromophenylimino)-2-mercaptoacetonitrile. | ___do___ | 5-(2-bromophenylimino)-4-imino-3-methyl-2-thiazolidinone. | 5-(2-bromophenylimino)-3-methyl-2,4-thiazolidinedione. |
| 24 | 2-(2-nitrophenylimino)-2-mercaptoacetonitrile. | ___do___ | 5-(2-nitrophenylimino)-4-imino-3-methyl-2-thiazolidinone. | 5-(2-nitrophenylimino)-3-methyl-2,4-thiazolidinedione. |
| 25 | 2-(3-chlorophenylimino)-2-mercaptoacetonitrile. | ___do___ | 5-(3-chlorophenylimino)-4-imino-3-methyl-2-thiazolidinone. | 5-(3-chlorophenylimino)-3-methyl-2,4-thiazolidinedione. |
| 26 | 2-(2-chlorophenylimino)-2-mercaptoacetonitrile. | ___do___ | 5-(2-chlorophenylimino)-4-imino-3-methyl-2-thiazolidinone. | 5-(2-chlorophenylimino)-3-methyl-2,4-thiazolidinedione. |
| 27 | 2-(4-chlorophenylimino)-2-mercaptoacetonitrile. | n-Propylisocyanate | 5-(4-chlorophenylimino)-4-imino-3-n-propyl-2-thiazolidinone. | 5-(4-chlorophenylimino)-3-n-propyl-2,4-thiazolidinedione. |
| 28 | 2-(3-bromophenylimino)-2-mercaptoacetonitrile. | Methylisocyanate | 5-(3-bromophenylimino)-4-imino-3-methyl-2-thiazolidinone. | 5-(3-bromophenylimino)-3-methyl-2,4-thiazolidinedione. |
| 29 | 2-(4-bromophenylimino)-2-mercaptoacetonitrile. | ___do___ | 5-(4-bromophenylimino)-4-imino-3-methyl-2-thiazolidinone. | 5-(4-bromophenylimino)-3-methyl-2,4-thiazolidinedione. |
| 30 | 2-(3-fluorophenylimino)-2-mercaptoacetonitrile. | ___do___ | 5-(3-fluorophenylimino)-4-imino-3-methyl-2-thiazolidinone. | 5-(3-fluorophenylimino)-3-methyl-2,4-thiazolidinedione. |
| 31 | 2-(4-fluorophenylimino)-2-mercaptoacetonitrile. | ___do___ | 5-(4-fluorophenylimino)-4-imino-3-methyl-2-thiazolidinone. | 5-(4-fluorophenylimino)-3-methyl-2,4-thiazolidinedione. |
| 32 | 2-(2,3-dichlorophenylimino)-2-mercaptoacetonitrile. | ___do___ | 5-(2,3-dichlorophenylimino)-4-imino-3-methyl-2-thiazolidinone. | 5-(2,3-dichlorophenylimino)-3-methyl-2,4-thiazolidinedione. |
| 33 | 2-(2,4-dichlorophenylimino)-2-mercaptoacetonitrile. | ___do___ | 5-(2,4-dichlorophenylimino)-4-imino-3-methyl-2-thiazolidinone. | 5-(2,4-dichlorophenylimino)-3-methyl-2,4-thiazolidinedione. |
| 34 | 2-(2,5-dichlorophenylimino)-2-mercaptoacetonitrile. | ___do___ | 5-(2,5-dichlorophenylimino)-4-imino-3-methyl-2-thiazolidinone. | 5-(2,5-dichlorophenylimino)-3-methyl-2,4-thiazolidinedione. |
| 35 | 2-(2,6-dichlorophenylimino)-2-mercaptoacetonitrile. | ___do___ | 5-(2,6-dichlorophenylimino)-4-imino-3-methyl-2-thiazolidinone. | 5-(2,6-dichlorophenylimino)-3-methyl-2,4-thiazolidinedione. |
| 36 | 2-(3,5-dichlorophenylimino)-2-mercaptoacetonitrile. | ___do___ | 5-(3,5-dichlorophenylimino)-4-imino-3-methyl-2-thiazolidinone. | 5-(3,5-dichlorophenylimino)-3-methyl-2,4-thiazolidinedione. |
| 37 | 2-(2,4-dibromophenylimino)-2-mercaptoacetonitrile. | ___do___ | 5-(2,4-dibromophenylimino)-4-imino-3-methyl-2-thiazolidinone. | 5-(2,4-dibromophenylimino)-3-methyl-2,4-thiazolidinedione. |
| 38 | 2-(2,5-dibromophenylimino)-2-mercaptoacetonitrile. | ___do___ | 5-(2,5-dibromophenylimino)-4-imino-3-methyl-2-thiazolidinone. | 5-(2,5-dibromophenylimino)-3-methyl-2,4-thiazolidinedione. |
| 39 | 2-(2,6-dibromophenylimino)-2-mercaptoacetonitrile. | ___do___ | 5-(2,6-dibromophenylimino)-4-imino-3-methyl-2-thiazolidinone. | 5-(2,6-dibromophenylimino)-3-methyl-2,4-thiazolidinedione. |
| 40 | 2-(3,4-dibromophenylimino)-2-mercaptoacetonitrile. | ___do___ | 5-(3,4-dibromophenylimino)-4-imino-3-methyl-2-thiazolidinone. | 5-(3,4-dibromophenylimino)-3-methyl-2,4-thiazolidinedione. |
| 41 | 2-(3,5-dibromophenylimino)-2-mercaptoacetonitrile. | ___do___ | 5-(3,5-dibromophenylimino)-4-imino-3-methyl-2-thiazolidinone. | 5-(3,5-dibromophenylimino)-3-methyl-2,4-thiazolidinedione. |
| 42 | 2-(2,4-difluorophenylimino)-2-mercaptoacetonitrile. | ___do___ | 5-(2,4-difluorophenylimino)-4-imino-3-methyl-2-thiazolidinone. | 5-(2,4-difluorophenylimino)-3-methyl-2,4-thiazolidinedione. |
| 43 | 2-(3,5-difluorophenylimino)-2-mercaptoacetonitrile. | ___do___ | 5-(3,5-difluorophenylimino)-4-imino-3-methyl-2-thiazolidinone. | 5-(3,5-difluorophenylimino)-3-methyl-2,4-thiazolidinedione. |
| 44 | 2-(2,4,5-trichlorophenylimino)-2-mercaptoacetonitrile. | ___do___ | 5-(2,4,5-trichlorophenylimino)-4-imino-3-methyl-2-thiazolidinone. | 5-(2,4,5-trichlorophenylimino)-3-methyl-2,4-thiazolidinedione. |
| 45 | 2-(3-bromo-4-methoxyphenylimino)-2-mercaptoacetonitrile. | ___do___ | 5-(3-bromo-4-methoxyphenylimino)-4-imino-3-methyl-2-thiazolidinone. | 5-(3-bromo-4-methoxyphenylimino)-3-methyl-2,4-thiazolidinedione. |
| 46 | 2-(2-fluorophenylimino)-2-mercaptoacetonitrile. | Ethylisocyanate | 5-(2-fluorophenylimino)-4-imino-3-ethyl-2-thiazolidinone. | 5-(2-fluorophenylimino)-3-ethyl-2,4-thiazolidinedione. |
| 47 | 2-(2,4-difluorophenylimino)-2-mercaptoacetonitrile. | n-Butylisocyanate | 5-(2,4-difluorophenylimino)-4-imino-3-n-butyl-2-thiazolidinone. | 5-(2,4-difluorophenylimino)-3-n-butyl-2,4-thiazolidinedione. |
| 48 | 2-(2-fluorophenylimino)-2-mercaptoacetonitrile. | n-Propylisocyanate | 5-(2-fluorophenylimino)-4-imino-3-n-propyl-2-thiazolidinone. | 5-(2-fluorophenylimino)-3-n-propyl-2,4-thiazolidinedione. |
| 49 | 2-(2-methyl-3-chlorophenylimino)-2-mercaptoacetonitrile. | Methylisocyanate | 5-(2-methyl-3-chlorophenylimino)-4-imino-3-methyl-2-thiazolidinone. | 5-(2-methyl-3-chlorophenylimino)-3-methyl-2,4-thiazolidinedione. |
| 50 | 2-(2-methyl-4-bromophenylimino)-2-mercaptoacetonitrile. | ___do___ | 5-(2-methyl-4-bromophenylimino)-4-imino-3-methyl-2-thiazolidinone. | 5-(2-methyl-4-bromophenylimino)-3-methyl-2,4-thiazolidinedione. |
| 51 | 2-(2-methyl-4-fluorophenylimino)-2-mercaptoacetonitrile. | ___do___ | 5-(2-methyl-4-fluorophenylimino)-4-imino-3-methyl-2-thiazolidinone. | 5-(2-methyl-4-fluorophenylimino)-3-methyl-2,4-thiazolidinedione. |
| 52 | 2-(2-methyl-5-chlorophenylimino)-2-mercaptoacetonitrile. | ___do___ | 5-(2-methyl-5-chlorophenylimino)-4-imino-3-methyl-2-thiazolidinone. | 5-(2-methyl-5-chlorophenylimino)-3-methyl-2,4-thiazolidinedione. |
| 53 | 2-(3-methylphenylimino)-2-mercaptoacetonitrile. | ___do___ | 5-(3-methylphenylimino)-4-imino-3-methyl-2-thiazolidinone. | 5-(3-methylphenylimino)-3-methyl-2,4-thiazolidinedione. |
| 54 | 2-(4-methylphenylimino)-2-mercaptoacetonitrile. | ___do___ | 5-(4-methylphenylimino)-4-imino-3-methyl-2-thiazolidinone. | 5-(4-methylphenylimino)-3-methyl-2,4-thiazolidinedione. |
| 55 | 2-(2-methyl-5-fluorophenylimino)-2-mercaptoacetonitrile. | ___do___ | 5-(2-methyl-5-fluorophenylimino)-4-imino-3-methyl-2-thiazolidinone. | 5-(2-methyl-5-fluorophenylimino)-3-methyl-2,4-thiazolidinedione. |
| 56 | 2-(2-methyl-6-chlorophenylimino)-2-mercaptoacetonitrile. | ___do___ | 5-(2-methyl-6-chlorophenylimino)-4-imino-3-methyl-2-thiazolidinone. | 5-(2-methyl-6-chlorophenylimino)-3-methyl-2,4-thiazolidinedione. |

| Ex. | Substituted 2-phenylimino-2-mercaptoacetonitrile | Isocyanate | Intermediate | Product |
|---|---|---|---|---|
| 57 | 2-(3-methyl-4-fluorophenylimino)-2-mercaptoacetonitrile. | do | 5-(3-methyl-4-fluorophenylimino)-4-imino-3-methyl-2-thiazolidinone. | 5-(3-methyl-4-fluorophenylimino)-3-methyl-2,4-thiazolidinedione. |
| 58 | 2-(3-methyl-6-chlorophenylimino)-2-mercaptoacetonitrile. | do | 5-(3-methyl-6-chlorophenylimino)-4-imino-3-methyl-2-thiazolidinone. | 5-(3-methyl-6-chlorophenylimino)-3-methyl-2,4-thiazolidinedione. |
| 59 | 2-(2-bromo-4-methylphenylimino)-2-mercaptoacetonitrile. | do | 5-(2-bromo-4-methylphenylimino)-4-imino-3-methyl-2-thiazolidinone. | 5-(2-bromo-4-methylphenylimino)-3-methyl-2,4-thiazolidinedione. |
| 60 | 2-(2-chloro-4-methylphenylimino)-2-mercaptoacetonitrile. | do | 5-(2-chloro-4-methylphenylimino)-4-imino-3-methyl-2-thiazolidinone. | 5-(2-chloro-4-methylphenylimino)-3-methyl-2,4-thiazolidinedione. |
| 61 | 2-(4-sec-butylphenylimino)-2-mercaptoacetonitrile. | do | 5-(4-sec-butylphenylimino)-4-imino-3-methyl-2-thiazolidinone. | 5-(4-sec-butylphenylimino)-3-methyl-2,4-thiazolidinedione. |
| 62 | 2-(3-chloro-4-methylphenylimino)-2-mercaptoacetonitrile. | do | 5-(3-chloro-4-methylphenylimino)-4-imino-3-methyl-2-thiazolidinone. | 5-(3-chloro-4-methylphenylimino)-3-methyl-2,4-thiazolidinedione. |
| 63 | 2-(3-chloro-4-methoxyphenylimino)-2-mercaptoacetonitrile. | do | 5-(3-chloro-4-methoxyphenylimino)-4-imino-3-methyl-2-thiazolidinone. | 5-(3-chloro-4-methoxyphenylimino)-3-methyl-2,4-thiazolidinedione. |
| 64 | 2-(3-ethylphenylimino)-2-mercaptoacetonitrile. | do | 5-(3-ethylphenylimino)-4-imino-3-methyl-2-thiazolidinone. | 5-(3-ethylphenylimino)-3-methyl-2,4-thiazolidinedione. |
| 65 | 2-(2-ethylphenylimino)-2-mercaptoacetonitrile. | Isopropylisocyanate. | 5-(2-ethylphenylimino)-4-imino-3-isopropyl-2-thiazolidinone. | 5-(2-ethylphenylimino)-3-isopropyl-2,4-thiazolidinedione. |
| 66 | 2-(2-methoxyphenylimino)-2-mercaptoacetonitrile. | Methylisocyanate. | 5-(2-methoxyphenylimino)-4-imino-3-methyl-2-thiazolidinone. | 5-(2-methoxyphenylimino)-3-methyl-2,4-thiazolidinedione. |
| 67 | 2-(3-methoxyphenylimino)-2-mercaptoacetonitrile. | do | 5-(3-methoxyphenylimino)-4-imino-3-methyl-2-thiazolidinone. | 5-(3-methoxyphenylimino)-3-methyl-2,4-thiazolidinedione. |
| 68 | 2-(4-methoxyphenylimino)-2-mercaptoacetonitrile. | Ethylisocyantae. | 5-(4-methoxyphenylimino)-4-imino-3-ethyl-2-thiazolidinone. | 5-(4-methoxyphenylimino)-3-ethyl-2,4-thiazolidinedione. |
| 69 | 2-(3-fluoro-4-methoxyphenylimino)-2-mercaptoacetonitrile. | Methylisocyanate. | 5-(3-fluoro-4-methoxyphenylimino)-4-imino-3-methyl-2-thiazolidinone. | 5-(3-fluoro-4-methoxyphenylimino)-3-methyl-2,4-thiazolidinedione. |
| 70 | 2-(4-sec-butoxyphenylimino)-2-mercaptoacetonitrile. | do | 5-(4-sec-butoxyphenylimino)-4-imino-3-methyl-2-thiazolidinone. | 5-(4-sec-butoxyphenylimino)-3-methyl-2,4-thiazolidinedione. |
| 71 | 2-(2-trifluoromethylphenylimino)-2-mercaptoacetonitrile. | do | 5-(2-trifluoromethylphenylimino)-4-imino-3-methyl-2-thiazolidinone. | 5-(2-trifluoromethylphenylimino)-3-methyl-2,4-thiazolidinedione. |
| 72 | 2-(3-trifluoromethylphenylimino)-2-mercaptoacetonitrile. | do | 5-(3-trifluoromethylphenylimino)-4-imino-3-methyl-2-thiazolidinone. | 5-(3-trifluoromethylphenylimino)-3-methyl-2,4-thiazolidinedione. |
| 73 | 2-(4-trifluoromethylphenylimino)-2-mercaptoacetonitrile. | do | 5-(4-trifluoromethylphenylimino)-4-imino-3-methyl-2-thiazolidinone. | 5-(4-trifluoromethylphenylimino)-3-methyl-2,4-thiazolidinedione. |
| 74 | 2-(2-nitro-5-chlorophenylimino)-2-mercaptoacetonitrile. | do | 5-(2-nitro-5-chlorophenylimino)-4-imino-3-methyl-2-thiazolidinone. | 5-(2-nitro-5-chlorophenylimino)-3-methyl-2,4-thiazolidinedione. |
| 75 | 2-(3-nitro-4-chlorophenylimino)-2-mercaptoacetonitrile. | do | 5-(3-nitro-4-chlorophenylimino)-4-imino-3-methyl-2-thiazolidinone. | 5-(3-nitro-4-chlorophenylimino)-3-methyl-2,4-thiazolidinedione. |
| 76 | 2-(3-nitro-4-fluorophenylimino)-2-mercaptoacetonitrile. | do | 5-(3-nitro-4-fluorophenylimino)-4-imino-3-methyl-2-thiazolidinone. | 5-(3-nitro-4-fluorophenylimino)-3-methyl-2,4-thiazolidinedione. |
| 77 | 2-(2-chloro-4-nitrophenylimino)-2-mercaptoacetonitrile. | do | 5-(2-chloro-4-nitrophenylimino)-4-imino-3-methyl-2-thiazolidinone. | 5-(2-chloro-4-nitrophenylimino)-3-methyl-2,4-thiazolidinedione. |
| 78 | 2-(3-fluoro-4-chlorophenylimino)-2-mercaptoacetonitrile. | do | 5-(3-fluoro-4-chlorophenylimino)-4-imino-3-methyl-2-thiazolidinone. | 5-(3-fluoro-4-chlorophenylimino)-3-methyl-2,4-thiazolidinedione. |
| 79 | 2-(3-fluoro-6-chlorophenylimino)-2-mercaptoacetonitrile. | do | 5-(3-fluoro-6-chlorophenylimino)-4-imino-3-methyl-2-thiazolidinone. | 5-(3-fluoro-6-chlorophenylimino)-3-methyl-2,4-thiazolidinedione. |
| 80 | 2-(3-chloro-4-fluorophenylimino)-2-mercaptoacetonitrile. | do | 5-(3-chloro-4-fluorophenylimino)-4-imino-3-methyl-2-thiazolidinone. | 5-(3-chloro-4-fluorophenylimino)-3-methyl-2,4-thiazolidinedione. |
| 81 | 2-(2-fluoro-4-chlorophenylimino)-2-mercaptoacetonitrile. | do | 5-(2-fluoro-4-chlorophenylimino)-4-imino-3-methyl-2-thiazolidinone. | 5-(2-fluoro-4-chlorophenylimino)-3-methyl-2,4-thiazolidinedione. |

*Example 82*

| | Percent |
|---|---|
| 5-(o-fluorophenylimino)-3-methyl-2,4-thiozolidinedione | 80 |
| Attapulgite clay | 16 |
| Calcium and magnesium lignin sulfonate | 2 |
| Sodium alkylnaphthalene sulfonate | 2 |

The above components are blended and micropulverized to an average particle size of less than 50 microns.

This powder is dispersed in water and applied pre-emergence to a freshly cut field of ratoon sugar cane. Application is made at a rate of 3.5 pounds of active ingredient per acre, suspended in 40 gallons of water per acre. The sugar cane proceeds to develop a good crop, and barnyardgrass, yellow foxtail, crabgrass, and smartweed are controlled.

*Examples 83–86*

The following compounds are formulated in like manner and amounts to the 5-(o-fluorophenylimino)-3-methyl-2,4-thiozolidinedione of Example 82 and exhibit similar herbicidal activity.

Ex. 83: 5-(3,4-dichlorophenylimino)-3-methyl-2,4-thiazolidinedione

Ex. 84: 5-(4-chlorophenylimino)-3-methyl-2,4-thiazolidinedione

Ex. 85: 5-phenylimino-3-methyl-2,4-thiazolidinedione

Ex. 86: 5-(3-fluoro-4-chlorophenylimino)-3-ethyl-2,4-thiazolidinedione

*Example 87*

| | Percent |
|---|---|
| 5-(4-methoxyphenylimino)-3-methyl-2,4-thiazolidinedione | 50 |
| Montmorillonite clay | 44 |
| Finely divided synthetic silica | 2 |
| Calcium sulfate dihydrate | 2 |
| Methyl cellulose | 1 |
| Dioctyl sodium sulfosuccinate | 1 |

The above components are blended and micropulverized to an average particle size below 50 microns.

An aqueous dispersion of the above formulations is prepared by thoroughly mixing 5 pounds of formulation with 45 gallons of water. The total volume of this suspension then is applied as a pre-emergence spray to a one-acre field of established asparagus. The asparagus produces a very good crop. Excellent control is obtained of crabgrass, goosegrass, dayflower, cocklebur and common ragweed.

*Examples 88–91*

The following compounds are formulated in like manner and amounts to the 5-(4-methoxyphenylimino)-3-methyl-2,4-thiazolidinedione of Example 87. Upon application the formulations exhibit comparable herbicidal activity to that shown in Example 87.

Ex. 88: 5-(4-chlorophenylimino)-3-ethyl-2,4-thiazolidinedione

Ex. 89: 5-(3-trifluoromethylphenylimino)-3-ethyl-2,4-thiazolidinedione

Ex. 90: 2-(4-iodophenylimino)-3-methyl-2,4-thiazolidinedione

Ex. 91: 2-(4-isopropylphenylimino)-3-methyl-2,4-thiazolidinedione

*Example 92*

| | Percent |
|---|---|
| 5-(3-bromophenylimino)-3-methyl-2,4-thiazolidinedione | 99 |
| Trimethylnonyl polyethyleneglycol ether | 1 |

The above components are blended and micropulverized to an average particle size smaller than 100 mesh. This concentrate is applied as a directed post-emergence treatment at a rate of 1 pound of active ingredient in 22 gallons of water per acre to a field of Irish potatoes which are approximately one foot tall. The application is made by utilizing leaf lifters so as to keep the spray off the crop foliage. Good growth of the potatoes is noted while excellent control is obtained of lamb's-quarters, wild radish, chickweed, field spurry, pigweed, crabgrass and yellow foxtail.

*Examples 93–95*

The following compounds are formulated in like manner and amounts to the 5-(3-bromophenylimino)-3-methyl-2,4-thiazolidinedione of Example 92. Upon application the formulations exhibit similar herbicidal activity to that shown in Example 92.

Ex. 93: 5-(3-nitrophenylimino)-3-methyl-2,4-thiazolidinedione
Ex. 94: 5-(2-nitrophenylimino)-3-methyl-2,4-thiazolidinedione
Ex. 95: 5-(3-chlorophenylimino)-3-methyl-2,4-thiazolidinedione

*Example 96*

| | Percent |
|---|---|
| 5 - (3 - bromophenylimino) - 3 - methyl - 2,4 - thiazolidinedione | 30 |
| Calcium magnesium lignin sulfonate | 15 |
| Hydrated attapulgite clay | 2 |
| Sodium carbonate | 1 |
| Water | 52 |

The above solid components are ground to pass a 30-mesh screen. The water is then added and the suspension sandground to an average particle size of less than 5 microns.

The above formulation is suspended in water at a rate of 25 pounds of active ingredient in 100 gallons, and is evenly applied at the start of the growing season over a measured acre of land being utilized for storing rails and railroad ties. The application results in complete control of a mixed population of annual and perennial broadleaf and grass weeds. Such weeds as quackgrass, goldenrod, foxtail, crabgrass, ragweed, pigweed, lamb's-quarters and milfort are controlled.

*Examples 97–98*

The following compounds are formulated in like amounts and similar manner to the 5-(3-bromophenylimino)-3-methyl-2,4-thiazolidinedione of Example 96 and upon application they exhibit similar herbicidal properties.

Ex. 97: 5-(3-fluorophenylimino)-3-methyl-2,4-thiazolidinedione
Ex. 98: 5-(4-chlorophenylimino)-3-n-propyl-2,4-thiazolidinedione

*Example 99*

| | Percent |
|---|---|
| Composition of Example 82 | 5.0 |
| Granular attapulgite clay (15–30 mesh) | 95.0 |

The formulation of Example 82 is slurried in 5 parts of water per part of formulation, and the slurry is sprayed on the granular attapulgite which is tumbled in a blender. After spraying is complete the granules are dried and the above composition is obtained.

The granules are spread by helicopter over a weed-infested railroad at a rate of 300 pounds of granules per acre. This treatment provides control of weeds described in Example 96.

*Example 100*

| | Percent |
|---|---|
| 5-(p-chlorophenylimino)-3-methyl - 2,4 - thiazolidinedione | 10 |
| Calcium, magnesium lignin sulfonate | 10 |
| Sodium alkylnaphthalene sulfonate | 2 |
| Kaolinite clay | 34 |
| Sodium sulfate, anhydrous | 10 |
| Sub-bentonite clay | 34 |

The above ingredients are blended and micropulverized to a particle size essentially below 100 microns. One half of this mixture is moistened with water, and moist granulated to form granules which are dried and sieved prior to use. The remaining half of the above composition is moistened with 18% water, extruded through a 3/16" die, and cut into pellets which are then dried and are ready for use.

These pellets and granules when applied in a similar manner to that of Example 99 exhibit similar herbicidal activity.

*Examples 101–103*

The following compounds are substituted for the 5-(p-chlorophenylimino)-3-methyl-2,4-thiazolidinedione of Example 100 and are formulated as in Example 100. Upon application they demonstrate similar herbicidal activity.

Ex. 101: 5 - (3 - fluorophenylimino)-3-methyl-2,4-thiazolidinedone
Ex. 102: 5-(3,4-dibromophenylimino)-3-methyl-2,4-thiazolidinedione
Ex. 103: 5-(4-methylphenylimino)-3-methyl-2,4-thiazolidinedone

*Example 104*

| | Percent |
|---|---|
| 5-(3-bromo-4-methoxyphenylimino) - 3 - methyl-2,4-thiazolidinedione | 20 |
| Isophorone | 72 |
| Nonylphenol polyethylene glycol ether | 5 |
| Amine salt of long-chain alkylbenzene sulfonate | 3 |

This composition is emulsified in water in the amount of 50 pounds of active ingredient in 225 gallons of water. The emulsion is applied at a rate of 150 gallons per acre to a freshly-disced fire lane in a forest. Excellent control is obtained of Andropogon, flower-of-an-hour, wild strawberry, pigweed, crabgrass, green foxtail, and quackgrass. The application is repeated at annual intervals.

*Example 105*

| | Percent |
|---|---|
| 5-(4-sec-butylphenylimino) - 3 - methyl - 2,4 - thiazolidinedione | 15 |
| Heavy aromatic naphtha | 85 |

The above components are stirred in a mixer until a homogeneous solution is obtained.

Forty pounds of the solution is dissolved in 150 gallons of herbicidal oil. The solution is sprayed beneath a picket fence at the rate of 5 gallons per 1000 square feet. Complete control is obtained of weedy vegetation which includes such species as switchgrass, crabgrass, pigweed, annual morning glory, goldenrod and fall Panicum.

*Example 106*

| | Percent |
|---|---|
| 5-(3,4-dichlorophenylimino) - 3 - methyl - 2,4-thiazolidinedione | 30 |
| Polyoxyethylene sorbitol hexa-oleate | 10 |
| Paraffinic hydrocarbon oil | 60 |

The above herbicidal component is ground to pass a 30-mesh screen, the liquid components are then added and the mix is sandground to an average particle size of less than 5 microns.

The dispersion is extended with water so that a 1% emulsion of the active ingredient is formed. The emulsion is sprayed on vegetation growing around telephone poles and highway signposts until the foliage is thoroughly wet. The treatment results in kill of the vegetation thus eliminating the need for hand trimming.

*Examples 107–108*

The following compounds are substituted for the 5-(3,4-dichlorophenylimino)-3-methyl - 2,4 - thiazolidinedione and are formulated in a like manner. Upon application they exhibit similar herbicidal activity.

Ex. 107: 5-(3-chloro-4-fluorophenylimino)-3-methyl-2,4-thiazolidinedione

Ex. 108: 5-(3,4-dichlorophenylimino)-2,4-thiazollidinedone

Example 109

The composition of Example 106 is extended with diesel oil in the proportion of 12 pounds of active ingredient in 100 gallons of diesel oil. The mixture is applied at 125 gallons per acre by means of a truck-mounted pressure sprayer to the shoulders and bridge abutments adjoining a highway. Season-long control is provided of a mixed vegetation including crabgrass, wild barley, yellow foxtail, meadow buttercup, mallow and cornflower.

Example 110

|                                                                  | Percent |
|------------------------------------------------------------------|--------:|
| 5-(m-bromophenylimino) - 3 - methyl - 2,4 - thiazolidinedione   | 80      |
| Attapulgite clay                                                 | 16      |
| Sodium and calcium lignin sulfonate                              | 2       |
| Sodium alkylnaphthalene sulfonate                                | 2       |

The above components are blended and micropulverized to a particle size below 50 microns.

The above wettable powder formulation is extended with water in such a manner that there is 20 pounds of active ingredient per 100 gallons. This suspension is uniformly applied as a pre-emergence treatment to a measured acre of land surrounding oil storage tanks. The application provides excellent control of a weed population comprising annual bluegrass, smooth crabgrass, giant foxtail, poverty grass, common ragweed, pepperweed, mustard and pigweed.

I claim:
1. The compounds of the following formula:

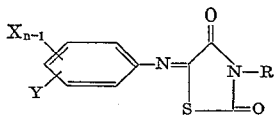

wherein R is alkyl of one through four carbon atoms; X is halogen; n is a positive integer less than 3; and Y is hydrogen, halogen, alkyl of 1 through 4 carbon atoms, alkoxy of 1 through 4 carbon atoms, trifluoromethyl or nitro.

2. The compounds of the following formula:

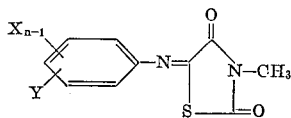

wherein X is halogen; n is a positive integer less than 3; and Y is hydrogen, halogen, alkyl of 1 through 4 carbon atoms, alkoxy of 1 through 4 carbon atoms, trifluoromethyl, or nitro.

3. 5-phenylimino-3-methyl-2,4-thiazolidinedione.
4. 5-(2-fluorophenylimino - 3 - methyl - 2,4 - thiazolidinedione.
5. 5-(4-chlorophenylimino) - 3 - methyl - 2,4 - thiazolidinedione.
6. 5-(3,4-dichlorophenylimino)-3-methyl - 2,4 - thiazolidinedione.
7. 5-(3-bromophenylimino) - 3 - methyl - 2,4 - thiazolidinedione.
8. 5-(3-chlorophenylimino) - 3 - methyl - 2,4 - thiazolidinedione.
9. 5-(3-fluorophenylimino) - 3 - methyl - 2,4 - thiazolidinedione.
10. 5 - (3,4 - dibromophenylimino) - 3 - methyl - 2,4-thiazolidinediol.
11. 5-(2-chlorophenylimino) - 3 - methyl-,24-thiazolidinedione.
12. 5-(2-bromophenylimino) - 3 - methyl - 2,4 - thiazolidinedione.
13. 5-(4-bromophenylimino) - 3 - methyl - 2,4 - thiazolidinedione.

References Cited by the Examiner
UNITED STATES PATENTS

| 2,837,529 | 6/1958  | Winthrop      | 260—306.7 |
| 2,856,277 | 10/1958 | Bluestone     | 71—2.5    |
| 2,860,962 | 11/1958 | Bluestone     | 71—2.5    |
| 2,952,673 | 9/1960  | Benghiat et al. | 260—306.7 |
| 3,053,847 | 9/1962  | Schicke       | 260—306.7 |

OTHER REFERENCES

Elderfield: Heterocyclic Compounds, vol. 5 (New York, 1957), pages 711–721.

ALEX MAZEL, *Primary Examiner.*

HENRY R. JILES, *Examiner.*

ALTON D. ROLLINS, *Assistant Examiner.*